INVENTOR

JOHN PAUL JONES, JR.

BY Watson, Cole, Grindle & Watson

ATTORNEYS

INVENTOR
JOHN PAUL JONES, JR.

BY Watson, Cole, Grindle & Watson
ATTORNEYS

INVENTOR
JOHN PAUL JONES, JR.
BY Watson, Cole, Grindle & Watson
ATTORNEYS

INVENTOR
JOHN PAUL JONES, JR.
BY Watson, Cole, Grindle & Watson
ATTORNEYS

FAST SCAN PAPER TAPE PUNCH-READERS AND CONTROL SYSTEMS THEREFOR

Filed June 18, 1965

INVENTOR
JOHN PAUL JONES, JR.

BY Watson, Cole, Grindle & Watson
ATTORNEYS

United States Patent Office 3,448,247
Patented June 3, 1969

3,448,247

FAST SCAN PAPER TAPE PUNCH-READERS AND CONTROL SYSTEMS THEREFOR

John Paul Jones, Jr., Wynnewood, Pa., assignor to Navigation Computer Corporation, a corporation of Pennsylvania Filed June 18, 1965, Ser. No. 465,010
Int. Cl. G06k 7/14, 1/20
U.S. Cl. 235—61.1 14 Claims

ABSTRACT OF THE DISCLOSURE

A punch paper tape system provides for a reversible direction selective ratchet detent mechanism convertible into rapid continuous advance, so that addressed tape having data in code block form can be searched rapidly by continuous scan to locate blocks for updating by punching new codes in unused code positions in a slower step-by-step punching mode. Verification of punching is provided by reading and proofing the punched tape codes before initiating a following punch operation.

This invention relates to paper tape punches and readers and control systems therefor and more particularly it relates to paper tape punch systems which permit the punch to be controlled for both continuous advance of paper tape therethrough and step-by-step advance in either direction, and which permit the punching and reading operations to be coordinated for purposes of verification.

In conventional prior art configurations, paper tape punches and paper tape readers have been specialized for specific single purpose operation. That is, in some control systems a paper tape punch should be high speed; in other systems the readers should be high speed. Some systems have required bi-directional feed of punched paper tapes or readers. However, prior art punches generally have not been constructed in such a manner that they were ideally suited for various types of applications which require bi-directional scanning, fast search for locating addresses on the tape, step-by-step operation for punching and reading one character at a time during an operation cycle in an associated system, or other features which relate to simplification of system operation by better performance of a comprehensive reader-punch transducer configuration.

Accordingly it is an object of this invention to provide a comprehensive punch paper tape transducer which is particularly adapted for use in data processing systems.

It is a more specific object of the invention to provide a paper tape punch which may be used to process paper tape rapidly and continuously for locating prior punch positions, such as required in systems locating code address positions in the tape.

It is another object of the invention to provide a comprehensive punched paper tape transducer that permits not only punching but reading in such a manner that the punching operation may be verified in the same operational cycle in which the punching occurred.

It is a further object of the invention to provide operating controls for comprehensive paper tape punch transducer for attaining various functional performance modes such as bi-directional tape scanning in either step-by-step or continuous high speed tape advance modes, verification by reading the punched holes, shifting from various modes of punch operation to other modes such as required, for example, in scanning a tape at high speed to stop at an addressed block and to find therein a position for inserting new data, and other controls that will be described hereinafter for comprehensive transducer operation in typical data processing systems.

In accordance with the present invention therefore a bi-directional paper tape punch is provided with means for converting it by electronic controls into a mode of operation which will continuously scan tapes at high speeds. In conjunction with the paper tape punch, a tape reader operates simultaneously in the same operating cycle with the tape punching or tape searching action so that modes of punch operation may be controlled to shift the tape advancing mechanism from high speed scan to step-by-step scan or punching mode in either direction, for example. When the reader and punch combination is used for purposes of verifying punched codes to assure that no mechanical errors were introduced, complete checking of all processing from the input code source through the output verification circuits is provided for a complete overall operational verification. Therefore the invention encompasses a comprehensive punch paper tape transducer and appropriate control systems therefore which are useful in general in data processing systems of various types such as an illustrative inventory control system.

The foregoing aspects of the invention together with further features of construction and advantage are described in detail hereinafter with reference to the accompanying drawings, wherein.

Figure 1:
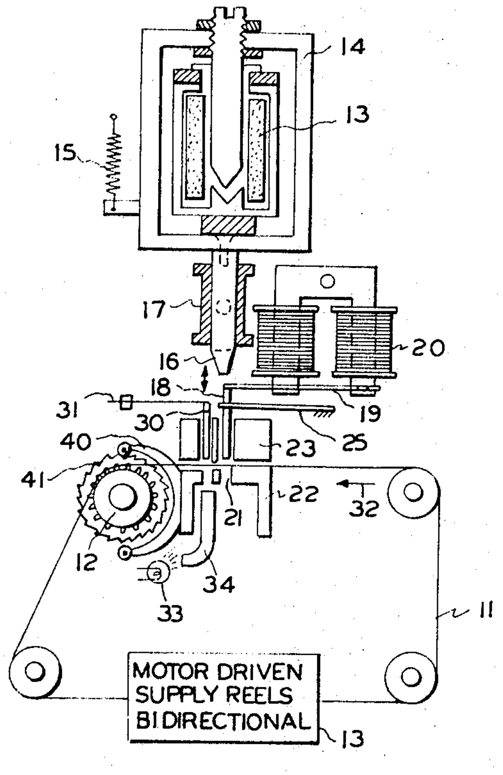
FIGURE 1 is a diagrammatic view, partly in section, of a punch assembly with paper tape transport shown in block diagram form.

As may be seen in FIGURE 1, a typical tape transducing system as provided by the invention is shown which incorporates the various features of a comprehensive device satisfying the requirement for multiple modes of operation suitable for data processing system applications. Thus it may be seen that the tape 11 may be bi-directionally advanced over a sprocket 12 and through the punch assembly by means of a bi-directional tape transport system 13. This transport system 13 may be a conventional system or one such as that described in my co-pending application filed Sept. 10, 1963, for "AC Motor Servo-Mechanism for Tape Transports," Ser. No. 307,886. The tape is punched by operation of a reciprocating power source supplied from momentary electromagnetic operation of solenoid 13 which moves cage 14 down against operation of the spring 15 to reciprocate punch hammer 16 through its bearing 17. In order to selectively and independently code a set of punch pins 18, an interposer 19 is provided for each punch pin. By electromagnetic operation, coils 20 serve to position the spring interposer 19 selectively in between the pin 18 and the hammer 16 when it is desired to move the punch pin 18 through the paper tape 11 by way of the die 21 in punch block 22 as guided through pin block 23. It is therefore clear that the stroke of the punch hammer 16 is such that it will push the pin through the paper when the interposer 19 is in place and will leave the pin in retracted position when the interposer 19 is not in punch position. The pin return spring 25 is provided for retracting the pin at the end of the hammer stroke cycle when the cage 14 is returned by spring 15.

Significant in this comprehensive paper tape processing transducer is the ability to read as well as punch. Thus a photocell block 30 together with extending circuit leads 31 is placed in a set of apertures in the punch block 23 at a position in the tape 11 representing the adjacent detented punch position to that actually being punched (as the tape travels in the direction of the arrow 32). The photocells are actuated through punched code holes in the tape by means of radiant energy from lamp 33 which is directed through the light pipe 34 in order to provide better response in the presence of chad and paper fuzz loosened by operation of the punch pin 18. Accordingly the punch operation cycle is such that the tape is punched and is advanced to the next position for a new punching cycle where it may be read by the photocells 30 during the same cycle while the information directing the punches is still retained, so that the actual punched holes are compared with the input coded information before the punch operation cycle is completed to provide in essence read time verification.

Figure 3:
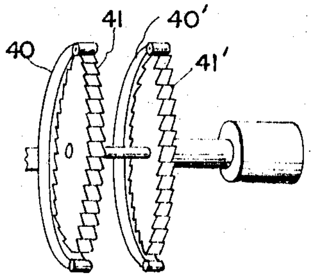
FIGURE 3 is a partial end view of a bi-directional transport embodiment afforded by the invention.
Figure 2:
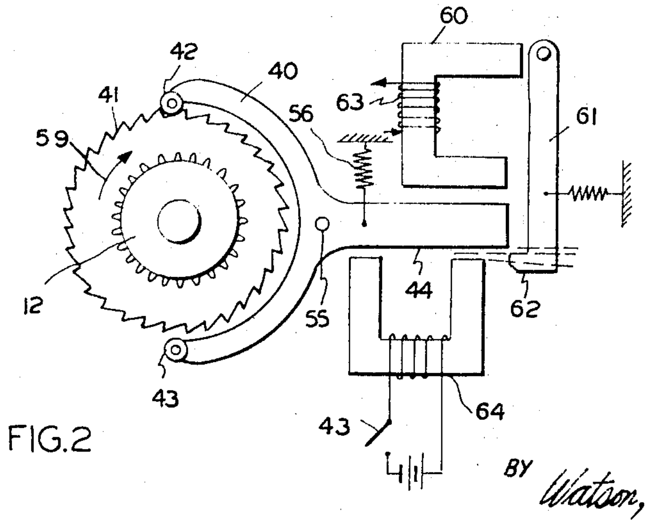
FIGURE 2 is a side view of a tape advancing submechanism used in accordance with the invention.

The tape advance mechanism comprising the double acting pawl arm or yoke 40 with the ratcheted drive wheel 41 is better shown from the views of FIGURES 2 and 3. On each extremity the pawl yoke is actuating roller 42, 43 which serves to engage, advance and detent the ratchet wheel 41 and the corresponding sprocket wheel position in a step-by-step tape advance mode of operation.

Thus as shown, the double acting yoke 40 is in its detented position with the roller 42 bottomed on the topmost tooth. To go through an operating cycle, the switch 43 is closed momentarily to electromagnetically pull the lever arm 44 down about pivot point 55 and against operation of the biasing spring 56 so that the roller 43 will engage and bottom in the appropriate slanted tooth and force it half way to the next detented stop position in the direction of arrow 59. Thus upon return of the lever arm 44 by means of the bias spring 56 the detent roller 42 engages the next slanted tooth in mid-position and bottoms in a precise detented punching position related to the tape by the position of sprocket 12. Thus the double acting yoke is operated by momentary closure of switch 43 to step the tape over a single incremental position, which for standard paper tape is one-tenth of an inch.

In accordance with the present invention, a further scanning control magnet 60 is provided with operating coil 61. This magnet serves to pivot lever 61 into position so that its extending tooth 62 will engage the lever arm 44 and retain it in a mid-operational position such that both rollers 42 and 43 are free of the ratchet wheel 41 and so that the tape is free to pass over the sprocket wheel roller 12 as a function of the bi-directional tape transport 13 in FIGURE 1 which provides tension to the tape in the direction in which it is programmed to advance it. In this operation both electromagnetic coils 63 and 64 are simultaneously operated in order to hold the lever arm 44 against limiting position provided by tooth 62 until such time that it is desired to return operation to the step-by-step mode of tape advance.

For bi-directional step-by-step advancement of the tape, the embodiment shown in FIGURE 3 may be utilized. This is an extension of the embodiment of FIGURE 2 wherein a further ratchet wheel 41' with corresponding double acting pawl yoke arm 40' is provided. If these ratchet wheels 41 and 41' are considered looking in the plane of FIGURE 2, the teeth on wheel 41' are of opposite slope and the yoke arm 40' therefore serves to advance the tape in the opposite direction with the physical layout such that the corresponding yoke lever arm would be pulled upwardly instead of downwardly by a further operating magnet. A corresponding tooth on an additional scanning lever such as 61 will hold the additional yoke operating lever arm in a neutral position whenever the fast scan mode of operation is programmed. Bi-directional controls are provided in such a way that only one of the yokes 40 is held in a neutral position and the other yoke is therefore effective in its step-by-step mode of operation to progress the tape incrementally in its corresponding single direction.

It is noted in connection with the foregoing comprehensive paper tape transducer that reliable operation may be performed which is consistent with requirements of data processing systems. This is possible because of the ability to read the tape in the form it is actually punched during a single punching cycle with simple inexpensive checking procedures, as will be described more completely in their system environment hereinafter. It is noted, however, that the provision for this sort of verification provides an overall check which monitors all steps in the punching process including intermediate processing of input signals, any errors in the reading of output signals by the verification circuits or pulse amplifiers, and any mechanical disorders that could be introduced by improper positioning of interposers or improper operation of punch pins, and so forth.

It is also noted that with the foregoing comprehensive punch paper tape transducer, punch paper tape may be rapidly scanned in high speed mode of operation so that a particular section of data may be located quickly as compared with operation in a step-by-step mode. Also because the reading device is provided with an optical reading head, the reading mode is high speed and this compatible with such faster scanning to locate a particular position identified by a storage location punched by code in the tape and quickly convert the system within the same data position to a step-by-step mode for further processing. Accordingly the read device may be used for feedback to a mode control system for converting the transport from high speed scan to a step-by-step punching or reading operation. It is noted that although a specific embodiment of the tape punch is shown, it is a desirable embodiment in that all the controls may be operated electrically by signals from a data processing control system and the therefore the paper tape transducer assembly is particularly adapted for incorporation in data processing systems which require comprehensive performance under direction of electrical impulses.

Figure 4:
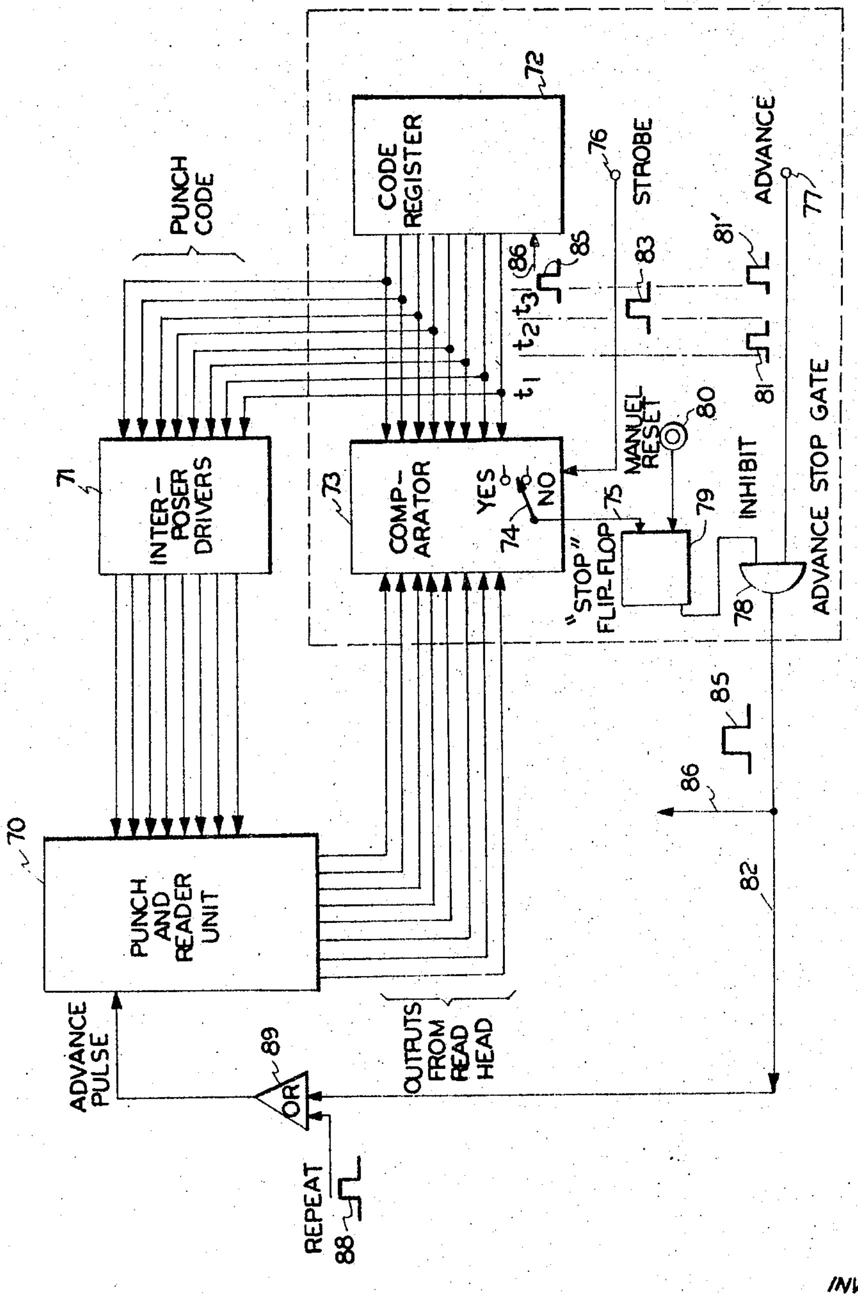
FIGURE 4 is a block diagram of a tape advance control system operating the punch transducer system in accordance with the principles of this invention.

Tape advance controls afforded by the present invention are typified in the block diagram representation of FIGURE 4. Thus the comprehensive tape transducer is illustrated by block 70 as a punch reader unit. The code for the punch is set up by an appropriate interposer driver block 71 having input punch codes derived from a code register 72, which may be part of a data processing system or which may be provided in some instances from a keyboard register or the like.

The input code signals in register 72 also serve as one set of input signals to comparator circuit 73, which has as its other set of input signals, those derived from the read head in the tape transducer unit 70. As indicated in the comparator block 73, a switch 74 is provided which may be used to given an output signal on lead 75 indicative of either a comparison or a non-comparison of the signals from the code register with the signals from the tape reader, for purposes hereinafter described.

The strobe pulse 83 at input terminal 76 to the comparator serves to synchronize and time the comparison in determining when the output signal at lead 75 will be gated. In this manner, the punch cycle is initiated by pulse 81 at the advance terminal 77 which may be received asynchronously at any desired time to initiate an operating cycle in the punch reader unit 70. However, the advance pulse is intercepted at an intermediate inhibit gate 78 which prevents operation of another cycle if an alarm is set into the "stop" flip-flop circuit 79 by means of the comparator signal at lead 75 so that a further punch cycle may not be initiated until the flip-flop is manually reset by way of operator actuated reset button 80.

To illustrate typical operation of the system the advance pulse 81 is indicated at time $t_1$ as starting a punch cycle by way of punch actuating lead 82. Thereafter at time $t_2$ which is during the punch cycle but after the punch operation is completed, the strobe pulse 83 is provided for comparison purposes in the verification. Normally an end of cycle operation is noted by the punch reader for initiating a new cycle and cleaning the code register by entry of a new code. For this purpose the new cycle is initiated by pulse 85 at the time $t_3$, which serves by lead 86 to start the cycle by introducing the new entry into the code register 72. This may be derived in other ways but in this exemplary cycle of operation is generated coincidentally with the next effective advance pulse 81' received at lead 77 and passed through gate 78 so that the first operation in the pulse cycle is to introduce a new code. Accordingly if the new advance pulse is inhibited at gate 75 because of an error in the previous operating cycle which resulted in a punched code different from that retained in the input code register 72, the code is retained to permit a delete code to be entered (by means not shown) and a new punch cycle may be initiated with the same code in register 72 by means of repeat pulse 88 at "or" circuit 89.

Note that the function of the switch 74 is to provide a selection of "comparison" or "error" signals at lead 75. This is desirable for initiating different modes of system operation. For example, if the high speed scan mode of reading is initiated, it is desirable to "compare" the code grouping being read with an address entry mode in code register 72 for finding any desired code entry on the tape.

On the other hand if it is desired to verify the punched code in the tape while operating in a step-by-step punch mode of operation in the manner hereinbefore described, a discrepancy or "error" between the code read from the tape and that in the register 72 is produced by the switch 74 in the "No" comparison output mode.

Figure 5:
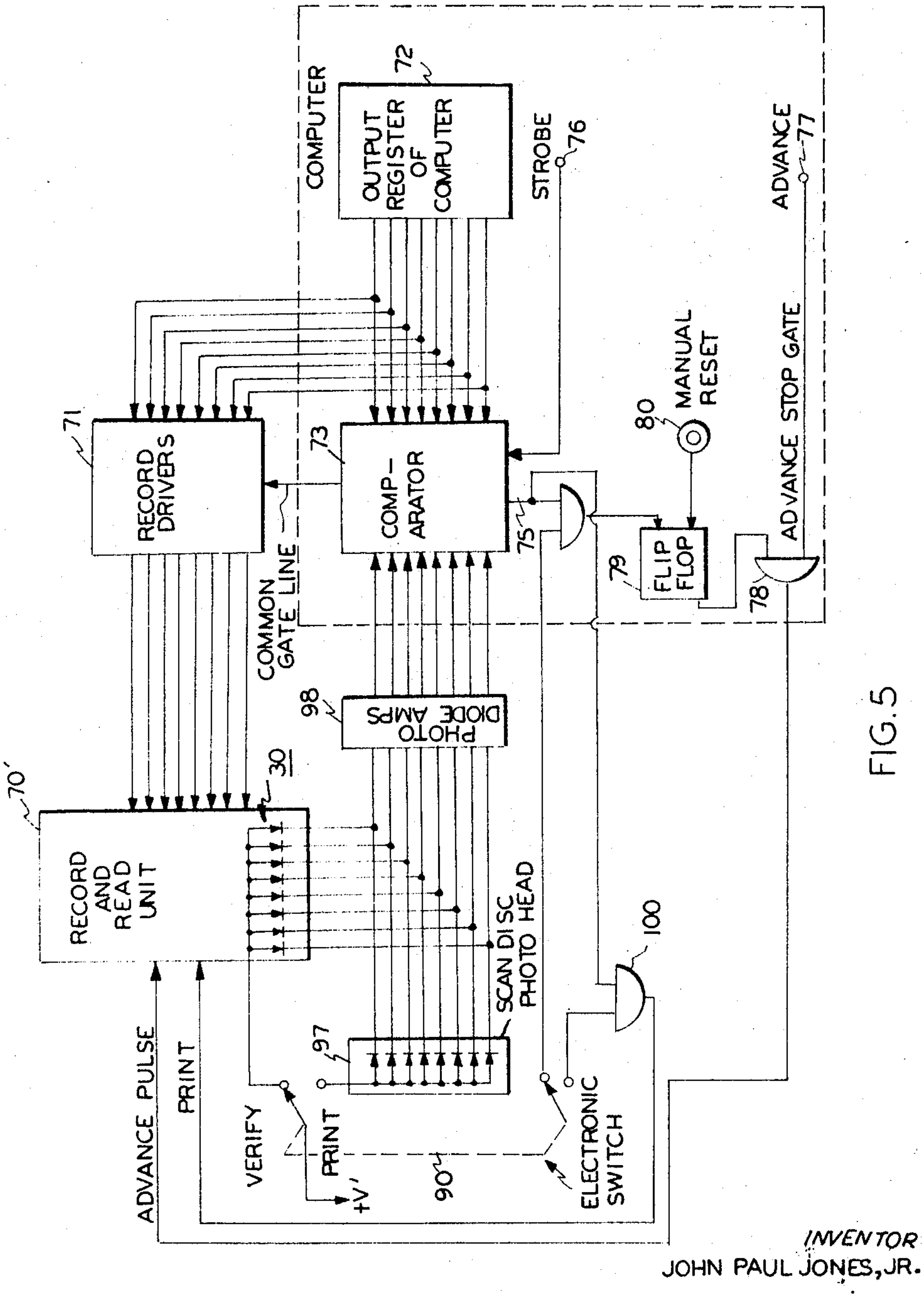
FIGURE 5 is a block circuit diagram of a combined print punch system incorporating this invention.

The embodiment of FIGURE 5 is similar in operation except that the verifying data producing system includes a printer in transducer 70', which is operated in alternative modes by alternating operation of switch 90 to print and verify while using the same common comparator unit 73 in both modes of operation. To better understand this operation, consider the printer in FIGURE 6, wherein a continuous motor drive 91 serves to rotate typewheel 92 and codewheel 93. Thus the print hammer 94 can be directed to impact the typewheel 92 to print on the tape 94 passed therebetween by an electrical impulse to solenoid 95.

The code groupings 96 on the codewheel 93 are reproduced by photodiode bank 97 in proper synchronism with presentation of a type character identified thereby to permit a print signal to be derived in comparator 73 as directed during the time a similar code set is retained in register 72 as entered by way of keyboard 97 or some other input source. Photodiode amplifiers 98 are provided together with a separate sprocket or strobe amplifier 99 which times the comparator output signal at gate 100 for operating the print hammer through amplifier 101. A system of this type for punching and printing a paper tape is more fully described in my co-pending application filed Aug. 11, 1964, for "Keyboard Operated Printer," Ser. No. 388,893.

Figure 6:
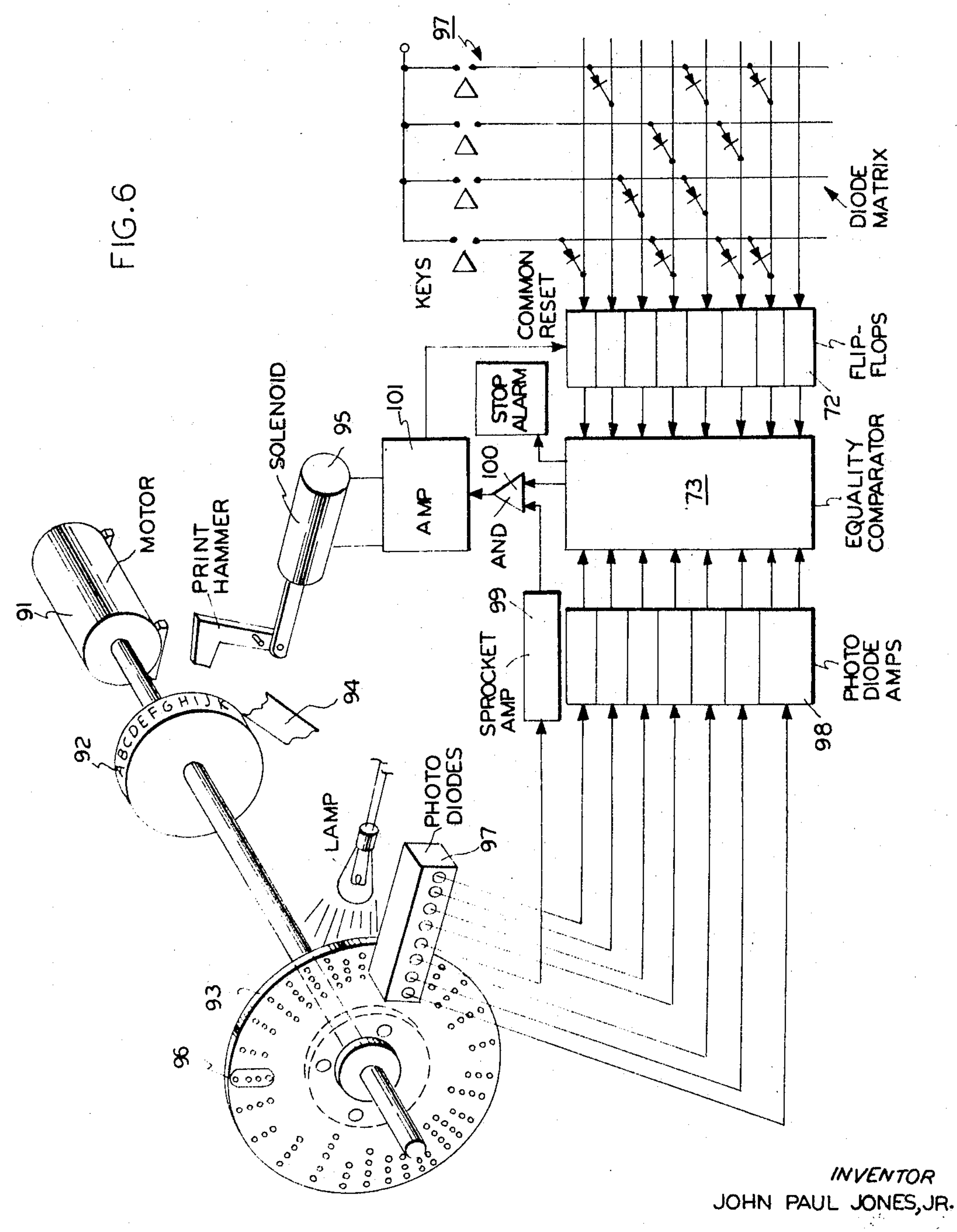
FIGURE 6 is a diagrammatic view, partially in block circuit diagram form, of a printer configuration such as used in the system shown in FIGURE 5.

Now referring again to FIGURE 5, where the corresponding elements are noted by similar reference characters, it may be seen that the features of the printer of FIGURE 6 and the verifying paper tape system of FIGURE 4 can be combined with addition of very little additional equipment. In essence the switch 90 serves the function of switching the printer circuiting into position for verifying the code punched on the tape in the manner hereinbefore described. Thus a simple, efficient verifying and printing recorder system by the improvements afforded in the present invention, where either a tape punch unit or a tape print-punch unit can be used in similar manner to produce verified punched tape.

Figure 7:
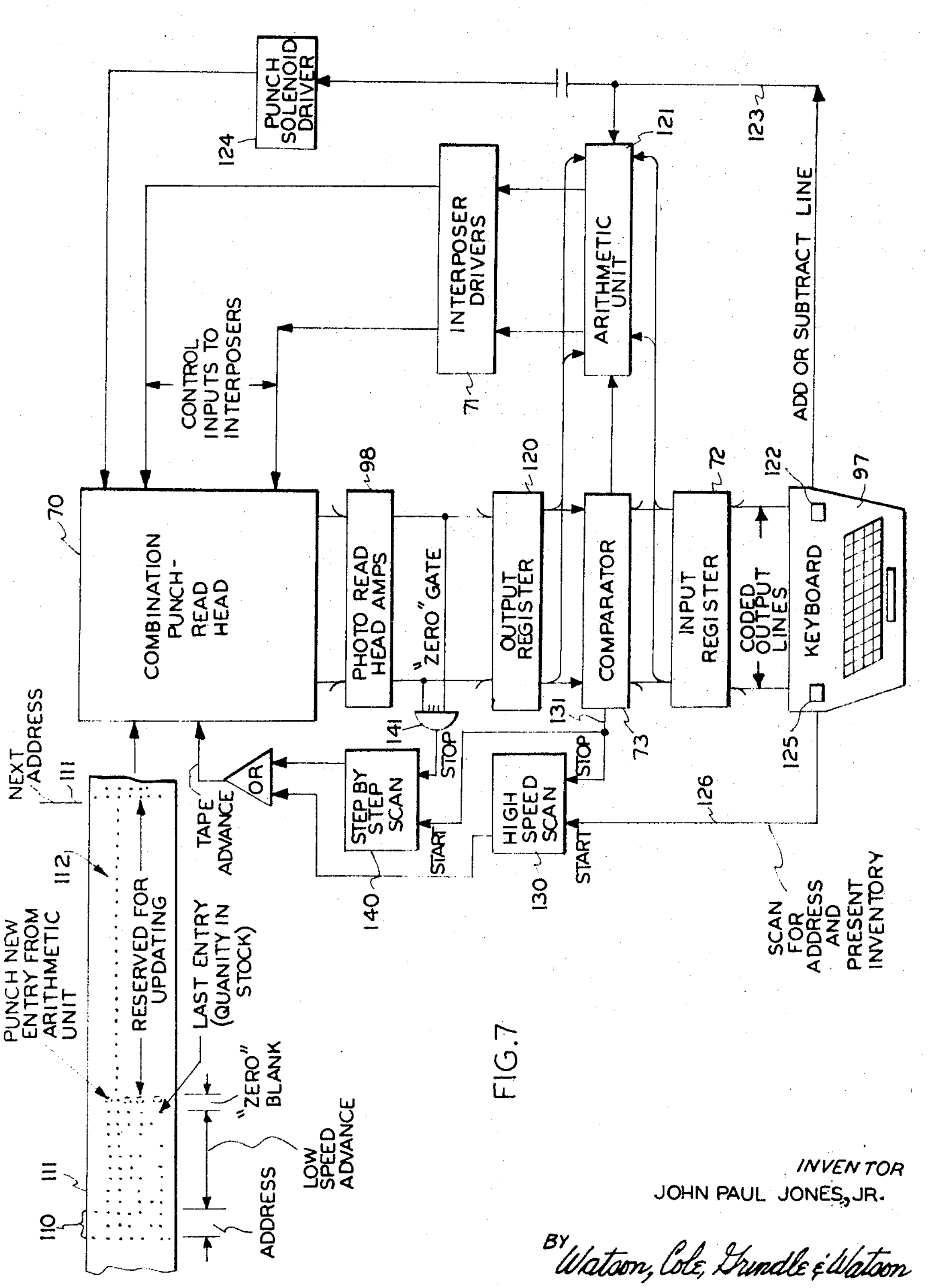
FIGURE 7 is a block circuit diagram of an inventory control system embodying the invention.

A typical data processing system for selecting addresses and updating block entries in the paper tape 11 is shown in FIGURE 7. Thus the length of punched paper tape is provided with an address entry 110 within a tape block that can have a variable length extending to the next address entry 111, and having therein a plurality of unpunched tape code positions 112 which are able to receive punched codes in an updating process.

As before described, the tape may be passed through transducer 70 in a continuous scan mode until an address location is found in comparator 73, where the step-by-step mode of operation is instituted. In this control system for the transducer 70, the photoread head output signals are retained in output register 120 so that arithmetic operations can be interposed in arithmetic unit 121 for updating tape as a function of the last entry.

Thus the arithmetic unit in one mode of operation serves only responsive to the comparator 73 to pass the code in input register 72 to the punch of transducer 70 in the verification mode hereinbefore described. However, in some data processing systems, such as an inventory processing system, a further entry may be made to input register 72 from the keyboard 97, such as a withdrawal or entry from inventory stock of the item identified by the tape block address. This then is accumulated with the last final entry read from the tape into output register 120, so that the updated or accumulated entry is punched by way of arithmetic unit 121 and interposer drivers 71.

The accumulated instruction to the arithmetic unit can be entered by key 122 along line 123 and this can also serve as a punch instruction through driver 124. Such is distinguished from the address scan mode of operation initiated by key 125 at lead 126, where the inventory identification code is entered into register 72 from the keyboard 97.

High speed scan instructions serve to operate the punch in the manner previously described through controls in block 130 which are released upon address comparison at lead 131. Similarly step-by-step control as performed in block 140 advances the tape when the address compare signal is received. The step-by-step control repetitively and cyclically steps the tape increment by increment responsive to receipt of a punch code in the tape as derived through "OR" circuit 141 from the photoread head. Thus, as soon as the first free entry position is located within the block, the tape halts for an inventory updating entry initiated through key 122 as described. The state of inventory can be displayed on register 120 before the entry is made to assure items are "in stock" before being "sold."

Accordingly it is seen that the present invention has afforded a simple and improved paper tape transducer and accompanying control systems which is useful in simplified systems for data processing. Thus, those features of novelty believed descriptive of the nature and scope of the invention are defined with particularity in the appended claims.

What is claimed is:

1. In combination in a paper tape punch device, punching means for selectively punching a paper tape, sprocket means for advancing the paper tape through the punching means in a step-by-step fashion, a detent mechanism engaging said sprocket to define detented positions at which the tape is indexed by said sprocket means, continuous scanning control means selectively disengaging the detent mechanism from said sprocket means to permit the tape to advance continuously without step-by-step indexing, and means advancing said paper tape continuously through said sprocket means when the detent mechanism is disengaged from said sprocket.

2. The combination defined in claim 1 wherein the advancing means is a motor driven tape transport system providing tension to the tape to advance it continuously through said sprocket means.

3. The combination defined in claim 1 wherein the sprocket means comprises a toothed wheel with a rocking yoke engaging the wheel at diametrically opposed positions to alternately advance the sprocket one-half a step position, and the scanning control means comprises a mechanism for holding the rocking yoke in an intermediate position out of engagement with teeth on the wheel.

4. In a paper tape punch with a reciprocating power source and a punch with a set of selectively engageable punch pins operated thereby through a cutting stroke, the combination of a tape advance sprocket mechanism for advancing tape through a step-by-step cycle from one punch position to the next, a removable detent mechanism coupled to hold the sprocket in a tape punch position, and tape tension means selectively permitting the tape to continuously pass through the punch at high speed with the detent mechanism removed.

5. Apparatus as defined in claim 4 wherein the last-mentioned means includes an electromagnetic scanning control circuit for removing the detent and moving said sprocket wheel with said tape tension means continuously during a selective scanning period, the detent comprising a two step reciprocating pawl yoke, and the removable detent means comprising a mechanism moving the reciprocating yoke to an intermediate position responsive to said scanning control circuit.

6. In a paper tape punch, a set of punch pins with means selectively and independently operating them through a cutting stroke, a shaft with a tape advance sprocket affixed thereon, a double action pawl, a power source reciprocating said pawl to advance the sprocket once over a predetermined tape increment for each punch stroke cycle in step-by-step manner, a notched ratchet wheel on said shaft engageable by the pawl to advance and detent the sprocket wheel during each reciprocation supplied by said power source, a further power actuated means selectively disengaging the pawl from the notches on the wheel to permit continuous rotation of said sprocket wheel, and tension means continuously tending to pull paper tape over the sprocket wheel so that the step-by-step action is converted to continuous tape feed when the pawl is disengaged.

7. A punch paper tape processing system comprising in combination, a tape punch, a tape reader, a paper tape transport mechanism providing for passing tape selectively in both a continuous high speed advance mode and a step-by-step advance mode through said tape punch and reader, means positioning said punch and reader at adjacent punch positions along said tape, means operating during a punch selection cycle verifying the newly punched tape before permitting a further punch cycle, advance control means selectively setting up an operation mode for driving said transport in the continuous advance mode, and reading means responsive in this mode to punched codes on the tape, a data storage register, and comparison means stopping the continuous tape advance at an address position identified by the data register.

8. A system as defined in claim 7 useful for inventory processing, wherein the tape has blocks of predetermined length each identified by an address code punched therein and providing an unpunched position for receiving updating punches, the system including means for advancing the tape step-by-step after the tape is stopped by said comparison means, said step-by-step advancing means automatically advancing the tape under control of a code on each successive punched code position appearing within the block thereby stopping the tape for receiving a new entry on the first blank code position in said block.

9. A system as defined in claim 8 including a keyboard assembly coupled for manual entry of tape block addresses into the address storage means.

10. A system as defined in claim 8 having an input data register and including arithmetic means for accumulating data in said register with the information read from the last entry code position by said tape reader, and means punching the accumulated data into the tape as a new entry within said block.

11. A punch paper tape processing system comprising in combination, a tape punch, a tape reader, a paper tape transport mechanism providing for passing tape selectively in both a continuous high speed advance mode and a step-by-step advance mode through said tape punch and reader, means positioning said punch and reader at adjacent punch positions along said tape, means operating during a punch selection cycle verifying the newly punched tape before permitting a further punch cycle, advance control means selectively setting up an operation mode for driving said transport in the step-by-step advance mode, reading means operable in the step-by-step advance mode to punched codes on the tape at locations not previously punched, a punch code register retaining signals from which the tape is punched, and comparison control means stopping the tape advance upon a discrepancy between the punched code and the code in said punch code register.

12. A tape processing system comprising in combination, a length of punched paper tape providing blocks of a plurality of tape code positions therein with a punched address code and a plurality of unpunched tape code positions for receiving punched codes, a paper tape transdducer operable to read code signals in said tape in both a continuous scan mode and a step-by-step processing mode and to punch in the latter mode, a comparator including means identifying a particular code and means responsive to the reading of said transducer of the code signals on the tape to identify that particular code thereby to select a specified address location and stop the tape thereat, and further means indexing the tape to one of said unpunched positions within the block in said step-by-step mode to punch therein a further coded entry.

13. Address locating apparatus for a paper tape punch and reading system in combination comprising a paper tape punch for punching a coded signal in paper tape, a tape transport for advancing the tape past the punch station, a reading station for reading coded signals from the punched tape positioned adjacent a punch position in the tape, controls for instituting the advance of the tape through the transport selectively in either a continuous mode or a step-by-step mode, register means storing a coded address signal, comparison means responsive in the continuous mode to both said coded address signal in the register means and the code read at the reading station from the punched tape providing a stop signal indicative of comparison of the two coded signals, and means stopping the continuous mode advance of said tape at a particular address location on the tape responsive to said stop signal and instituting the step-by-step mode of advance of the tape.

14. A system as defined in claim 13 including means for advancing the tape through the transport step-by-step to adjacent punch positions in response to asynchronous advance signals, and means stopping the tape advance upon receipt of a signal indicating the two codes are not identical, whereby a punch signal error is indicated.

References Cited

UNITED STATES PATENTS 3,083,898 4/1963 Ives et al. ____________ 234—34

DARYL W. COOK, *Primary Examiner.*

U.S. Cl. X.R.

234—34, 129; 235—61.11